June 23, 1931.    P. GOLDBERG ET AL    1,811,687
ADJUSTABLE OUTLET BOX
Filed Feb. 15, 1930
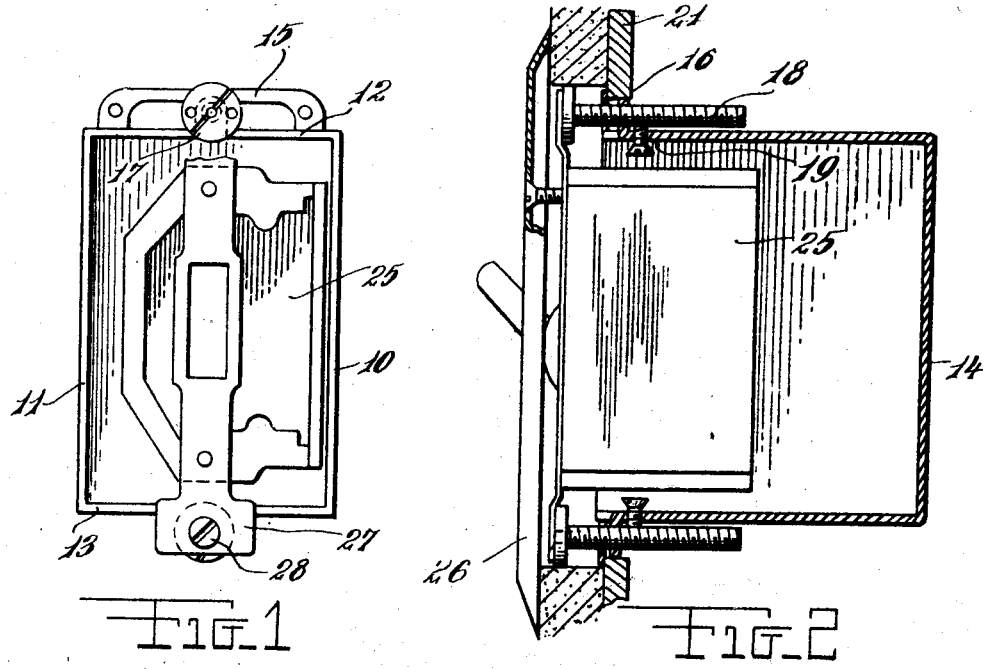
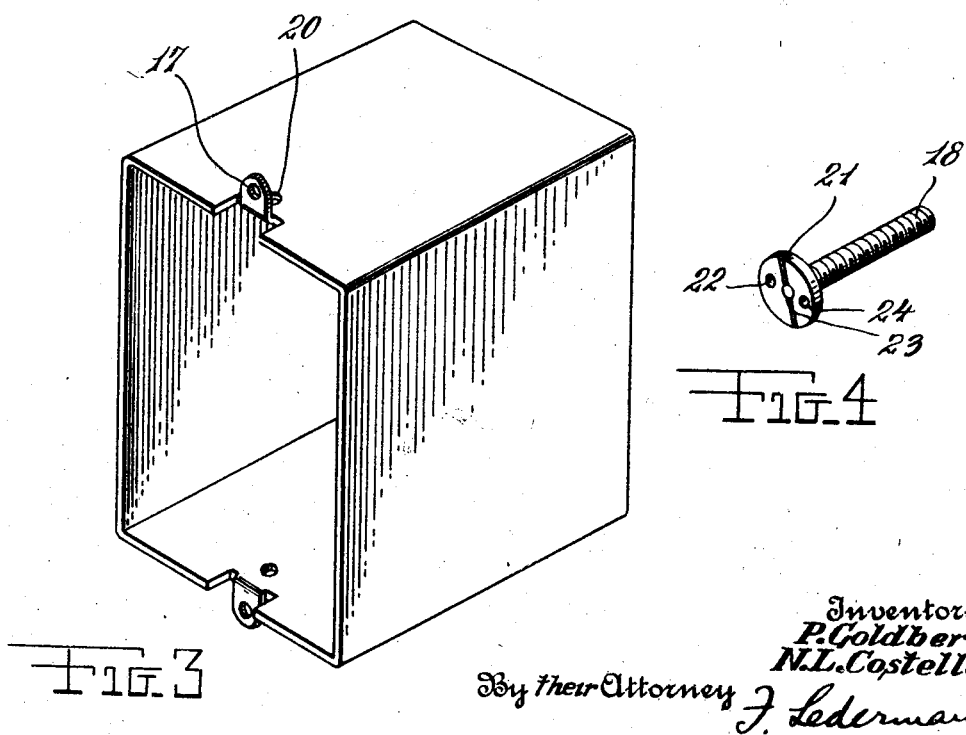
Inventors
P. Goldberg
N. L. Costello
By their Attorney
J. Ledermann Patented June 23, 1931

1,811,687

UNITED STATES PATENT OFFICE

PHILIP GOLDBERG AND NELSON L. COSTELLO, OF MOUNT VERNON, NEW YORK

ADJUSTABLE OUTLET BOX

Application filed February 15, 1930. Serial No. 428,600.

The main object of this invention is to provide a utility for fastening switches to the wall or the like. The particular purpose is to provide a screw upon an outlet box mounted in such manner that the outlet box may be set slightly askew in the wall, the screw being so designed as to permit readily adjusting and levelling of the switch and switch plate so that said switch and switch plate may be perfectly plumbed.

Another object of the invention is to provide a device in the form of an outlet box having screws thereon, which permit the box to be embedded in the wall at greater or lesser depth, the screws providing means for adjusting the position of the switch mechanism contained in the outlet box in a position flush with the wall of the structure in which the outlet box is mounted.

The above and other objects will become apparent in the description below, in which characters of reference refer to like named parts in the drawings.

Referring briefly to the drawings, Figure 1 is a front elevational view of the outlet box showing a switch mounted therein.

Figure 2 is a sectional side elevational view of the outlet box showing the method of mounting a switch unit therein.

Figure 3 is a perspective view of the outlet box per se.

Figure 4 is a perspective view of the adjusting screw used with the outlet box.

Referring in detail to the drawings, the numerals 10 and 11 indicate the side walls of an outlet box, and walls 12 and 13 are formed rigidly with the side walls 10 and 11. These outlet boxes are provided with a bottom 14 and the bottom, side walls and end walls are preferably formed with knockouts to permit the mounting of the ends of the flexible conduits therein as is commonly used in the art today. These knockouts are not shown on the drawings for the purpose of clarity. The end walls 12 and 13 are provided with angle flanges 15, to which attaching means are secured when mounting the outlet box in an aperture in a wall. Intermediate the length of the end walls 12 and 13, the material is slitted in two spaced apart positions and the intermediate material is opened outwardly from the end walls to provide right angled ears 16. These ears have threaded openings 17 formed therein, in which are engaged the threaded shanks 18 of adjusting screws. The shanks 18 are adapted to be locked or set by relatively small screws 19 which are engaged in threaded openings 20, the openings being formed immediately behind the ears 16 of the outlet box. A symmetrical flat head 21 surmounts the shank 18 of the adjusting screws. This head is substantially thin in proportion to the remainder of the adjusting screw and is provided with a plurality of linearly spaced apart threaded openings 22, 23 and 24. The usual switch unit 25 is adapted to be inserted into the box and its means of anchorage comprises a crossbar 26, which is securely fastened to the switch unit 25 and is provided with enlarged ears 27 at its opposite ends through which securing means such as a screw 28 pass.

The device is utilized for anchoring the ends of conduits carrying current conducting wires to a specific location. The outlet box illustrated in the several figures is adapted to house the switch unit 25. It frequently happens that these outlet boxes are mounted slightly askew and in unplumbed condition. Should the outlet box be mounted too deep for the switch unit to rest in flush position upon the wall, the adjusting screws 18, which are mounted in the ears 16 may through rotation be longitudinally shortened so that the face of the heads 21 of the adjusting screws may lift the switch unit 25 out of the outlet box until the proper position has been arrived at. After the switch unit has been raised to a position where its face is flush with the wall, surface plumbing may be made. Should the outlet box be angularly offset, the screws 28 may be inserted into any of the openings 22, 23 and 24 in the head of the adjusting screws 18. In this manner, the switch unit may be perfectly levelled or plumbed so that the exterior switch plate assumes a level position when ultimately mounted. The adjustment screws by being provided with this plurality of openings 22, 23 and 24, will permit a universal displacement of the switch unit 25 in this outlet box. When trial adjustment has been made of the adjusting screws and the switch unit, the latter is removed and the said screws 19 are tightened so that they impinge upon the surface of the shank 18 of the adjusting screws and thus lock these screws in place on the outlet box in a rigid manner.

The above and other objects will become apparent in the description below in which characters of reference refer to like named parts in the drawings.

We claim:

1. In a device of the class described, an outlet box adapted to house a switch unit, adjusting screws, ears on said outlet box, said ears being stepped down from the marginal edge of said box, said adjusting screws engaging said ears, a set screw mounted in said outlet box engaging said adjusting screw for securing the screw in adjusted position, a head on said adjusting screw, a plurality of openings in said head, said adjusting screw being used in pairs, said openings being selectively engaged to displace said switch units when said switch unit is secured to said adjusting screws.

2. In a device of the class described, an outlet box adapted to house a switch unit, adjusting screws, ears on said outlet box, said ears being stepped down from the marginal edge of said box, said adjusting screws engaging said ears, a set screw mounted in said outlet box engaging said adjusting screw for securing the screw in adjusted position, a head on said adjusting screw, a plurality of aligned threaded openings, all but one of said threaded openings being offset from the axis of said adjusting screw, said adjusting screw when rotated being adapted to shift on the central threaded opening selectively from one position to another to permit angular, sidewise or vertical displacement of said switch unit.

In testimony whereof we affix our signatures.

PHILIP GOLDBERG.
NELSON L. COSTELLO.